United States Patent [19]

McManamon

[11] 4,006,303
[45] Feb. 1, 1977

[54] FILTERED TRANSITION DISTORTION CHANNEL QUALITY MONITOR

[75] Inventor: Peter Michael McManamon, Boulder, Colo.

[73] Assignee: The United States of America as represented by the Secretary of the Navy, Washington, D.C.

[22] Filed: Dec. 29, 1975

[21] Appl. No.: 644,471

[52] U.S. Cl. .......................... 178/69 A
[51] Int. Cl.² ...................... H04L 25/06
[58] Field of Search ......... 178/69 A, 69 G, 69 R; 325/42; 328/162, 163, 164; 324/57 DE

[56] References Cited

UNITED STATES PATENTS

| 3,025,349 | 3/1962 | Peterson | 178/69 A |
| 3,036,290 | 5/1962 | Zarouni | 178/69 A |
| 3,130,268 | 4/1964 | Peterson et al. | 178/69 A |
| 3,278,684 | 10/1966 | Geraghty et al. | 178/69 R |
| 3,479,458 | 11/1969 | Lord et al. | 178/69 A |
| 3,649,916 | 3/1972 | Winters | 328/163 |
| 3,715,666 | 2/1973 | Mueller et al. | 178/69 R |

*Primary Examiner*—Thomas A. Robinson
*Attorney, Agent, or Firm*—R. S. Sciascia; G. J. Rubens; H. Fendelman

[57] ABSTRACT

A system for measurement of teletype or other communication channel quality wherein the bit signal element duration is divided into $m$ subintervals. A plurality of transition counters are provided such that each transition counter counts the number of DC transitions occurring during a different set of said subintervals. The counts are then summed for a predetermined plurality of bits. The monitoring device of the present invention is then calibrated by comparing the sums from each of the plurality of transition counters with a known error reference. The most accurate transition counter is thereby determined and is subsequently used for on-line distortion monitoring.

5 Claims, 4 Drawing Figures

FILTERED TRANSITION DISTORTION CHANNEL QUALITY MONITOR

BACKGROUND OF THE INVENTION

The present invention relates generally to signal distortion monitoring and more particularly to the distortion of the pulse signals representing coded groups of information. Coded groups of pulses presently are widely used such as in digital computers, data processing, radar and telegraphy. When mark and space codes are employed as in telegraphy, the information transmitted is represented by a series of ideally rectangular pulses. The leading and trailing edges of these pulses are the transitions from mark to space or space to mark. Although ideally the transitions are abrupt, in practice they become distorted for various reasons such as ionospheric path reflections.

Heretofore many attempts have been made using signal combining techniques, analog time base measurements and cathode ray tube display techniques to give indications of the distortion of the pulses on the line. The U. S. Navy has in the past used a distortion analyzer which functions by looking for the position of the leading or trailing edge of the mark or space pulse to determine if it occurred too early or too late and then averages the effect over a number of pulses. Historically, the distortion analyzer meter output did not correlate with the printer output at the receiver end of the system. A simplistic explanation of this non-correlation is that the crypto device, intermediate the receiver and the output printer, utilizes the data pulse midpoint as a basis of data recognition whereby the trailing or leading edge location is usually an irrevelant consideration. Other distortion monitoring techniques have had only a limited degree of accuracy.

SUMMARY OF THE INVENTION

The purpose of the estimation process and apparatus disclosed herein is to monitor and measure channel quality. Channel quality is expressed in terms of bit error rate by means of suitable DC transition filtering. This filtering of operating circuit measured DC transitions is performed on the basis of measured values of the DC distortion parameter. The total number of filtered events within a time interval T gives the estimators of the bit error rate. The process is described in terms of a single Frequency Division Multiplex (FDM) subchannel with Frequency Shift Key (FSK) modulation and non-regenerative threshold (level-crossing) detection. The process, however, is directly applicable to other multiplexing techniques and modulations with either non-regenerative or some of the current regenerative detection methods. The technique of the present invention can be implemented with or without synchronization; however the absence of the expected transition time based on a synchronized clock results in less accurate estimates of the bit error rate. Accordingly, the technique with DC transition time synchronization is described herein. Any of the known synchronization techniques may be used according to the present invention although it should be kept in mind that the synchronization circuit error adds directly to the error in estimating the bit error rate.

The quality monitor of the present invention outputs on an arbitrary scale a number indicative of the channel quality. Since the present invention is more sensitive than prior visual techniques such as viewing a CRT or a printer output and other known techniques, use of the present invention can result in anticipation of communication problems and correction of such problems and, likewise, can inform the operator to discontinue an input to the computer at the receiver end of the system to prevent compiling erroneous data.

The present invention is described in terms of a telegraphic communication. A DC distortion parameter is chosen to serve as an estimator of the number of errors in a time interval. In order to define the DC distortion parameters, each bit signal element duration is divided into m subintervals. The numerical value of m is chosen to be the smallest integer for which no more than one transition can occur in any subinterval. A plurality of sets of subintervals or "windows" are chosen from the m subintervals. The number of DC transitions occuring within each of the plurality of windows is counted. The counts are summed over a predetermined number of bits and then compared against a known error reference to determine which window provides the most accurate representation of the true bit error. This window is subsequently used by the operator as the error rate estimator of signal quality.

STATEMENT OF THE OBJECTS OF THE INVENTION

It is the primary object of the present invention to disclose a transition distortion channel monitor that is more sensitive and more reliable than previous devices thereby permitting more efficient and meaningful channel quality monitoring.

Other objects, advantages and novel features of the invention will become apparent from the following detailed description of the invention when considered in conjunction with the accompanying drawings.

DESCRIPTION OF THE PREFERRED EMBODIMENT

Figure 1:
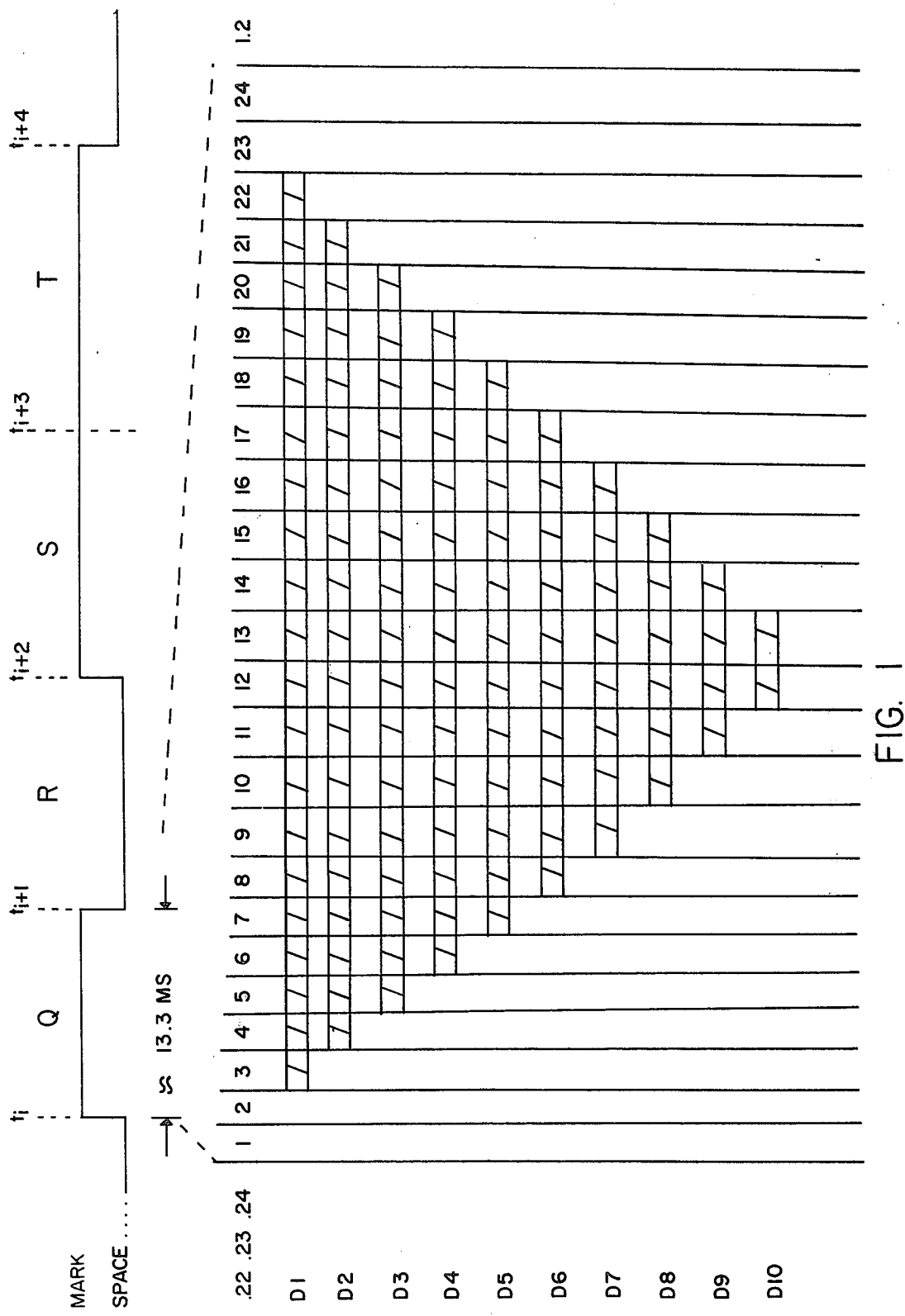
FIG. 1 is an illustration of an exemplary two level mark and space DC signal without DC distortion and further illustrating the $m$ subintervals into which each bit is divided.

In order to facilitate an understanding of the present invention, the algorithm upon which the present invention is based will be described in conjunction with the exemplary waveform illustrated in FIG. 1. The two level mark and space DC signal without DC distortion will always have transitions at times $t_i$, $t_{i+1}$, $t_{i+2}$, $t_{i+3}$, $t_{i+4}$, etc., assuming the information signal has a transition. This is illustrated in FIG. 1 for an exemplary 75 bit per second signalling rate. The times $t_i$, $t_{i+1}$, $t_{i+2}$, etc., are obtained from a clock which is synchronized to the received signal at the FSK modem converter DC output before signal regeneration. Each bit signal element duration is divided into m subintervals. As stated above the numerical value of $m$ is chosen to be the smallest integer for which no more than one transition can occur in any subinterval. As an example, $m = 24$ in the illustration of FIG. 1. It is seen therein that bit Q is divided into 24 subintervals as would be bits R, S, T and each of the subsequent bits used in the summation process described below.

Since the information signal is random, a discrete parameter, discrete state random process may be used to represent the distorted information signal at the DC level. Let $x(i, m)$ be the random variable of this process. Further, $x(i, m)$ is defined herein to be zero for the $m^{th}$ subinterval of the $i^{th}$ bit in the information sequence, if and only if no transition has occurred during that time. Then $x(i, m)$ is unity whenever a transition does occur in the $m^{th}$ subinterval of the $i^{th}$ bit. According to the present invention, no distinction is made between the two types of transitions, i.e., mark-to-space and space-to-mark. The received signal is translated to the $x(i, m)$ sequence with $x(i, m) = 0, 1$ for any $i, m$ and $m = 1, 2, \ldots, 24$.

According to the technique of the present invention as illustrated in the drawings, there is defined on $x(i, m)$ a set of 10 DC distortion intervals or windows designated as $D_j$, $j = 1, 2, \ldots, 10$. It is to be understood, however, that other numbers of windows could be used. These windows are illustrated in FIG. 1 and are listed in Table I below in terms of the $m$ intervals of the $i^{th}$ bit which are and are not included in $D_j$.

TABLE I

| DC Transition Distortion Interval | Bit Subintervals m not Included in $D_j$ | Bit Subintervals m Included in $D_j$ |
|---|---|---|
| $D_1$ | m = 1 to 2 and 23 to 24 | m = 3 to 22 |
| $D_2$ | m = 1 to 3 and 22 to 24 | m = 4 to 21 |
| $D_3$ | m = 1 to 4 and 21 to 24 | m = 5 to 20 |
| $D_4$ | m = 1 to 5 and 20 to 24 | m = 6 to 19 |
| $D_5$ | m = 1 to 6 and 19 to 24 | m = 7 to 18 |
| $D_6$ | m = 1 to 7 and 18 to 24 | m = 8 to 17 |
| $D_7$ | m = 1 to 8 and 17 to 24 | m = 9 to 16 |
| $D_8$ | m = 1 to 9 and 16 to 24 | m = 10 to 15 |
| $D_9$ | m = 1 to 10 and 15 to 24 | m = 11 to 14 |
| $D_{10}$ | m = 1 to 11 and 14 to 24 | m = 12 to 13 |

Considering a sequence of L consecutive information bits, the bit error rate estimator parameters $N(D_j)$ are defined by the following $x(i, m)$ summations. $N(D_j)$ is then the total number of DC transitions of either type which occurred in the $D_j$ subintervals of the $L$ bits, i.e., $$N(D_j) = \sum_{i=1}^{L} \sum_{m=j+2}^{23-j} x(i, m) \quad j=1, 2, \ldots, 10 \quad (1)$$

from which it follows that $$N(D_j) = N[D(D_{j-1})] - \sum_{i=1}^{L} \quad (2)$$

-continued
$$[x(i, j+1) + x(i, 24-j)] \quad j=2, 3, \ldots, 10$$

For example, two of the parameters $N(D_j)$ which are of particular interest are $N(D_6)$ and $N(D_9)$.

$$N(D_6) = \sum_{i=1}^{L} \sum_{m=8}^{17} x(i, m) \quad (3)$$

$$N(D_9) = \sum_{i=1}^{L} \sum_{m=11}^{14} x(i, m) \quad (4)$$

The subintervals $m = 1, 2$ and $m = 23, 24$ have been excluded because they involve the largest number of transitions which are correct and consequently the smallest number that are associated with bit errors.

A number of frequency diversity $x(i, m)$ sequences were measured in accordance with the present invention. The value of L, i.e., the number of information bits over which the summation is computed, was 9,000 bits in the present example which corresponds to 2 minutes of FSK transmission at 75 bits per second. It is noted at this point that an increase in the number of bits L used in the estimate would increase the accuracy of the estimates and that a decrease in the number L would shorten the measurement time, but at the expense of a reduction of accuracy in the estimates. Each sequence of L bits was designated as a record. Some example of the results for $N(D_j)$, $j = 1, 2, \ldots, 10$ are illustrated in Table II below. The symbol $N_e$ denotes the number of bit errors independently recorded for the same L bit sequence from which $x(i, m)$ was measured. The five examples in Table II below range from $N_e = 0$ to $N_e = 550$. It is noted that the most accurate and, therefore the most significant estimate appears to be contained in the $N(D_6)$ to $N(D_{10})$ totals.

See Table II on the following page.

TABLE II

|  | Record 1 $N_e = 3$ | Record 2 $N_e = 4$ | Record 3 $N_e = 0$ | Record 4 $N_e = 382$ | Record 5 $N_e = 550$ |
|---|---|---|---|---|---|
| $N(D_1)$ | 826 | 975 | 733 | 2378 | 2514 |
| $N(D_2)$ | 63 | 232 | 22 | 1604 | 1746 |
| $N(D_3)$ | 15 | 81 | 1 | 1099 | 1270 |
| $N(D_4)$ | 6 | 32 | 0 | 786 | 990 |
| $N(D_5)$ | 4 | 20 | 0 | 577 | 787 |
| $N(D_6)$ | 4 | 13 | 0 | 434 | 591 |
| $N(D_7)$ | 4 | 7 | 0 | 320 | 473 |
| $N(D_8)$ | 4 | 4 | 0 | 231 | 351 |
| $N(D_9)$ | 2 | 2 | 0 | 145 | 211 |
| $N(D_{10})$ | 2 | 1 | 0 | 64 | 105 |

As is evident from Table II an estimation of $N_e$, the actual bit error rate, is approached from the point of view of upper and lower bounds, e.g., an upper bound may be established by N ($D_6$) and a lower bound may be established by N ($D_9$).

Figure 2:
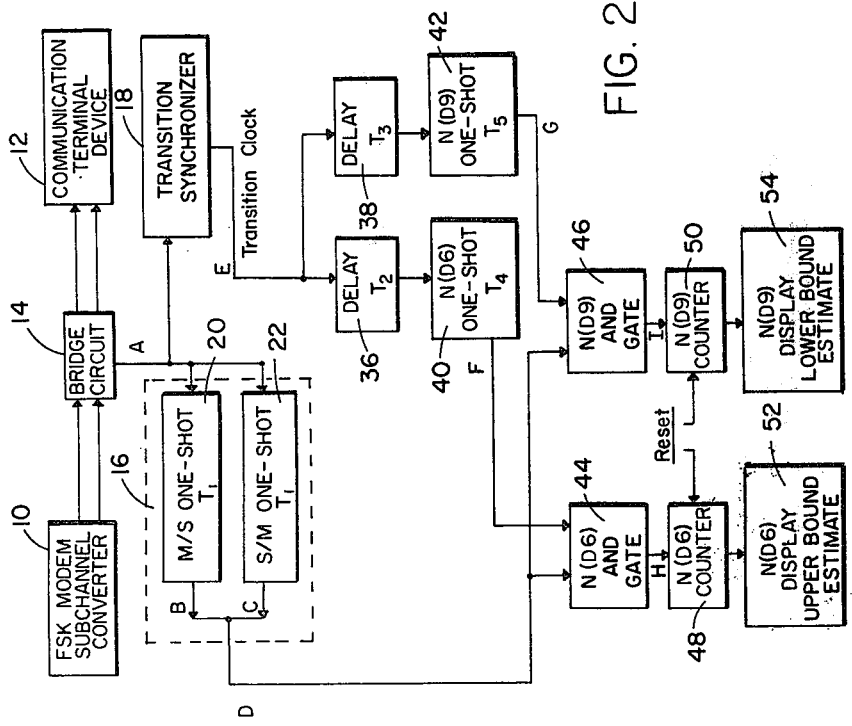
FIG. 2 is a schematic diagram of the preferred implementation of the present invention.

An apparatus for implementation of the above described algorithm is illustrated in the block diagram of FIG. 2, the device being illustrated with estimators N ($D_6$) and N ($D_9$) only, it being understood that a similar network could be provided, if desired, for each of the other estimators N ($D_1$) through N ($D_5$), N ($D_7$), N ($D_8$) and N ($D_{10}$).

Figure 4:
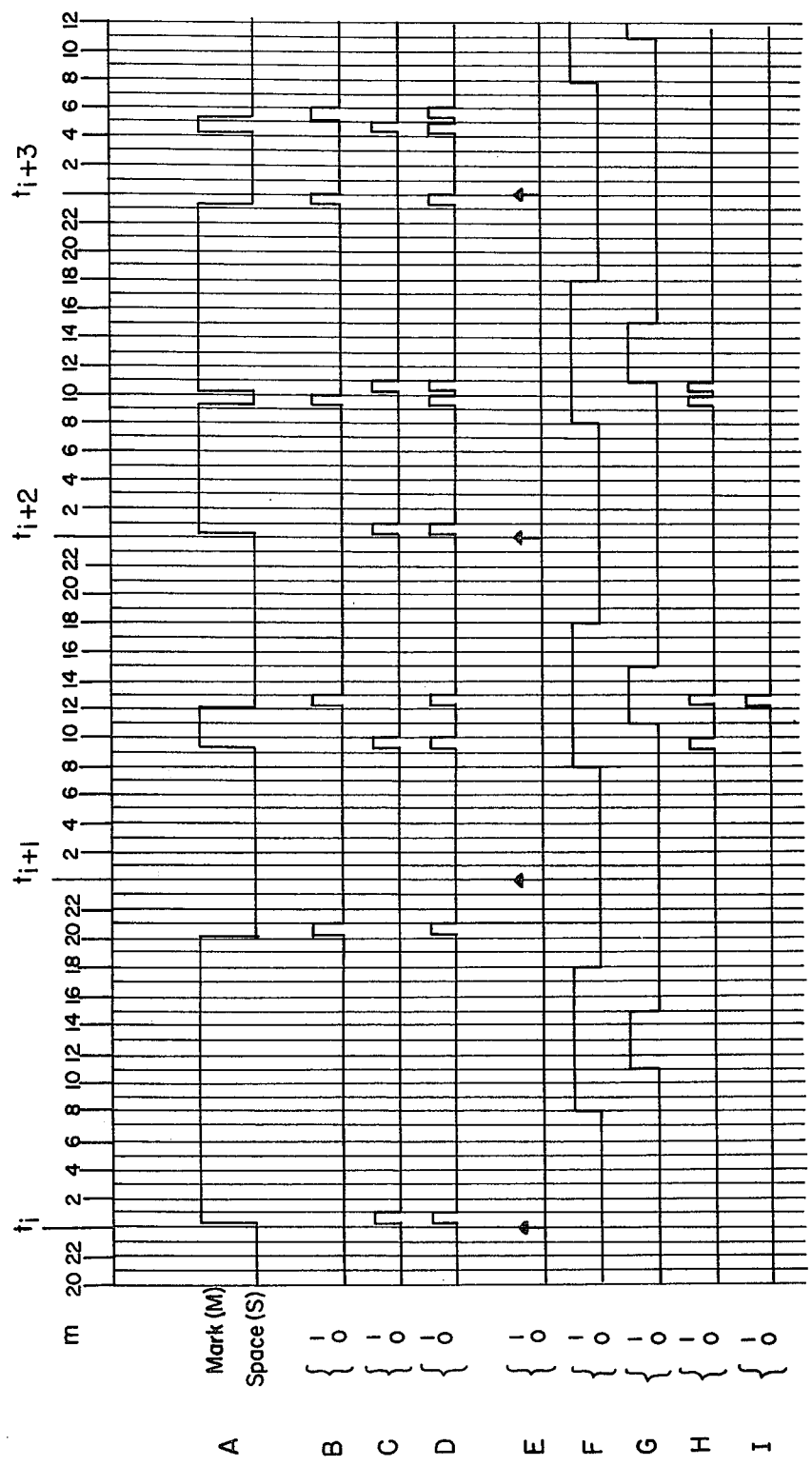
FIG. 4 is a timing diagram of the outputs indicated in FIG. 2.

The communication system illustrated herein comprises a frequency shift keyed modem subchannel converter 10 which transmits binary data to a communication terminal device 12. At the terminal device 12 end of the communication link is located bridge circuit 14. One output of the bridge circuit 14 is applied to the communication terminal device 12 and the other bridged output of the bridge circuit is applied to the transition detector 16 and the transition synchronizer 18 as illustrated. The timing sequence illustrated in FIG. 4 gives an example of a data communication between the subchannel converter 10 and the terminal device 12. The data signal, illustrated in FIG. 4 as waveform A, has two levels, designated as mark (M) and space (S). The two types of transitions which occur in the data signal are space-to-mark (S/M) and mark-to-space (M/S). The timing interval from $t_i$ to $t_{i+1}$ corresponds to the time duration of a mark or space, under the conditions that perfect synchronization is maintained and that no transition errors occur.

The transition detector 16 comprises two monostable multivibrators 20 and 22 designated as the M/S one-shot and the S/M one-shot, respectively. Multivibrator 20 responds only to the mark-to-space transitions and generates a short pulse output each time that a mark-to-space transition occurs. The pulse duration is $T_1$ where $T_1$ is very much less than $(t_{i+1} - t_i)/m$ and $m = 24$ in this example. FIG. 1 and 4 show the subdivision of the $t_i$ to $t_{i+1}$, $t_{i+1}$ to $t_{i+2}$, etc., intervals into $m = 24$ subintervals. The output of the M/S one-shot 20 is illustrated as waveform B in FIG. 4. An output pulse is illustrated in FIG. 4 for waveform B in correspondence with each mark-to-space transition of waveform A. Similarly, the S/M one-shot multivibrator 22 responds only to space-to-mark transitions and generates a short pulse output each time that a space-to-mark transition occurs. The pulse duration $T_1$ is the same as the one-shot 20 output pulse. The output of the one-shot 22 is designated as waveform C in FIG. 2 and is illustrated in FIG. 4. An output pulse is shown in FIG. 4 for waveform C in correspondence with each space-to-mark transition of waveform A. The combined output of the two one-shots 20 and 22 is obtained at the output of transition detector 16 and is designated D and is illustrated in FIG. 4 as the combination of waveforms B and C.

Figure 3:
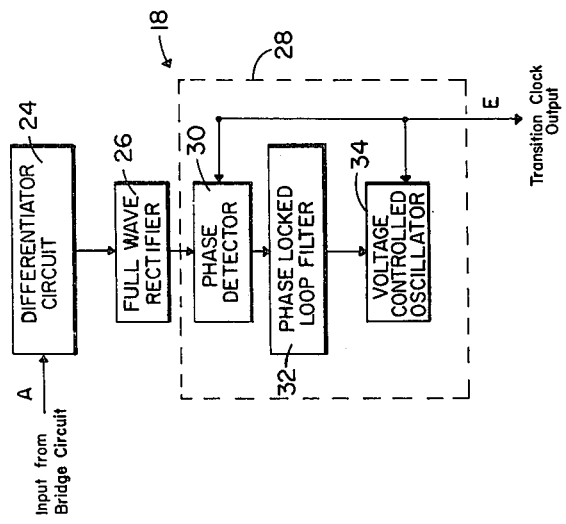
FIG. 3 is a schematic diagram of the transition synchronizer of FIG. 2.

The transition synchronizer 18 provides an output pulse at the end of each information bit period and can be implemented in a variety of manners, one of which is illustrated in FIG. 3 and is described further in *Phase Lock Techniques*, by Floyd Gardner, 1966, pp. 117-119. The data signal A from the bridge circuit 14 is applied to differentiator circuit 24 which marks the times at which DC transitions occur. The full wave rectifier 26 then generates a half-sine wave pulse of the same polarity for each M/S and S/M transition. The rectified signal contains a discrete frequency component at the frequency of the transitions. The rectified output is applied to a phase locked loop 28 comprising a phase detector 30, phase locked loop filter 32 and voltage controlled oscillator 34. The voltage controlled oscillator 34 generates the desired clock signal which is designated as E in FIS. 2, 3 and 4. FIG. 4 illustrates the clock output E when near perfect synchronization is maintained. The phase locked loop 28 may also be implemented by one of a number of early-late gate tracking circuits or by more advanced phase locked loops such as a double phased locked loop with an inner and an outer phase locked loop.

The transition clock E is applied to the delay circuit 36 and also the delay circuit 38. The delay circuit 36 outputs a pulse after a delay equal to $T_2$ where $T_2$ is $8(t_{i+1} - t_i)/m$ and $m = 24$ in this example. In other words, the transition clock pulse is delayed for 8 subintervals by the delay circuit 36. This is illustrated in FIG. 1 and also FIG. 4 where it is seen that the N ($D_6$) estimating window begins at the eighth subinterval after the occurrence of time $t_i$. Similarly, the transition clock pulse is delayed by eleven subintervals by the delay circuit 38. The delay circuit 36 output pulse triggers the N ($D_6$) one-shot multivibrator 40 which generates a pulse of duration $T_4$ and then turns off. This pulse duration $T_4$ corresponds to the 10 subinterval window width illustrated for $D_6$ in FIG. 1 and also illustrated as the 10 subinterval width waveform F in FIG. 4. Waveform F thus represents the one-shot 40 output. Similarly, the delay circuit 38 output pulse triggers the N ($D_9$) one-shot 42 which generates a pulse of duration $T_5$ indicated as waveform G in FIG. 4 and illustrated as the estimator window $D_9$ in FIG. 1. The duration of $T_5$ is equal to four subintervals.

The output D of the transition detector 16 is inputted to a plurality of AND gates, one being provided for each estimator circuit utilized, two in the present illustration. Referring again in FIG. 2, AND gates 44 and 46 receive their other inputs, respectively, from one-shot 40 and one-shot 42. The output H of AND gate 44 pulses N ($D_6$) counter 48 and the output I of AND gate 46 pulses N ($D_9$) counter 50. The outputs of counters 48 and 50 are subsequently displayed on display devices 52 and 54 which may comprise, for example, electromechanical, optical, or semiconductor numerical displays, such as light emitting diodes, or warning lights or indicators, or computer, minicomputer or microcomputer printer output displays, or CRT displays, or combinations of the above.

In operation, AND gates 44 and 46 will provide DC high outputs upon the simultaneous occurrence of DC highs or logic 1's at their inputs. AND gate 44 will thus output a high when it receives simultaneous highs or logic 1's from transition detector 16 and one-shot 40 thus contributing a count of one to the upper bound estimate. Similarly, AND gate 46 will output a high when it simultaneously receives highs from transition detector 16 and one-shot 42 thus contributing a count of one to the lower bound estimate. This operation is illustrated in FIG. 4 wherein it is seen that simultaneous 1's on waveforms D and F result in DC highs or logic 1's on waveform H representing the upper bound estimate. Similarly, simultaneous highs on waveforms D and G result in a DC high on waveform I representing the lower bound estimate. It also can be observed that waveform I has only one DC high in the present example whereas waveform H has four. This is due to the fact that the lower bound estimator comprised of delay 38, one-shot 42, AND gate 46, counter 50 and display 54 utilizes a much narrower sensing window then does the upper bound estimator comprised of delay 36, one-shot 40, AND gate 44, counter 48 and display 52.

According to the present invention, each estimator circuit is comprised of a delay circuit such as delay 36 or 38 utilized for establishing the starting time for the estimation window. For example, a $D_1$ estimator would delay the transition clock E by three subintervals and a $D_7$ estimator would delay the transition clock by nine subintervals. Each estimator circuit would also include a circuit such as one-shot 40 or 42 for setting the width of the sensing window. For example, a $D_1$ estimator one-shot would remain on for 20 subintervals and a $D_7$ estimator one-shot would remain on for eight subintervals as is evident from FIG. 1. Each estimator circuit further comprises a coincidence gate such as AND gates 44 and 46 and a counter such as 48 or 50 for outputting a count each time a DC transition occurs within the estimator circuit time window. Obviously, as many estimator circuits as is desired or practical could be provided. In order to determine the most accurate estimator circuit and/or the most accurate pair (upper and lower bound) of estimator circuits, a signal having a known number of DC information bit transitions could be transmitted over the communication channel. A counter could be directly connected to the transition detector 16 to determine the total number of DC transitions whereby, by simple arithmetic, the number of DC error transitions could be calculated. This figure would then be compared with the outputs of each of the estimator circuits to subsequently determine which circuit or circuits is the most accurate estimator.

Obviously many modifications and variations of the present invention are possible in the light of the above teachings. It is therefore to be understood that within the scope of the appended claims the invention may be practiced otherwise than as specifically described.

What is claimed is:

1. A DC transition monitor comprising:
    first means for providing a DC pulse train output including information bit DC transitions, which, when they occur, do so at integral multiples of the information bit period $t$ and also including an unknown number of spurious DC transitions at unknown intervals;
    second means connected to said first means for outputting a pulse in response to each DC transition occurring in said DC pulse train;
    third means connected to said first means for outputting a pulse at the end of each said bit period $t$;
    fourth means for outputting a plurality of pulses, the leading edge of each of said plurality of pulses occurring after a predetermined time delay after the occurrence of each of said third means pulses, said predetermined time delay being different for each of said plurality of pulses, and each of said plurality of pulses having different widths; and
    N means each connected to said second means and to said fourth means for outputting a pulse each time there is a simultaneously occurring second means pulse and one of said fourth means plurality of pulses.

2. The monitor of claim 1 further including a counter connected to the output of each of said N means.

3. The monitor of claim 1 wherein said fourth means comprises:
    N different delay, time delay circuits; and
    N one-shot multivibrators each connected to one of said N different delay, time delay circuits, each of said N one-shot multivibrators having a different on time.

4. The monitor of claim 3 wherein said N means comprises N AND gates.

5. The monitor of claim 4 wherein said second means comprises:
    first and second one-shot multivibrators activated by low to high and high to low DC transitions, respectively.

* * * * *